(12) United States Patent
Chapman et al.

(10) Patent No.: US 10,553,034 B2
(45) Date of Patent: Feb. 4, 2020

(54) CO-VIEWING IN VIRTUAL AND AUGMENTED REALITY ENVIRONMENTS

(71) Applicant: Amazon Technologies, Inc., Seattle, WA (US)

(72) Inventors: Adam Chapman, Santa Monica, CA (US); Alexandria Way-Wun Kravis, Seattle, WA (US); Brandon Scott Love, Seattle, WA (US); Christopher Taylor, La Canada, CA (US); Lars Christian Ulness, Seattle, WA (US); Felicia Yue, Mukilteo, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/932,353

(22) Filed: Feb. 16, 2018

(65) Prior Publication Data

US 2019/0259207 A1 Aug. 22, 2019

(51) Int. Cl.
*G06T 19/00* (2011.01)
*G06F 3/01* (2006.01)
*G02B 27/01* (2006.01)

(52) U.S. Cl.
CPC ........ *G06T 19/006* (2013.01); *G02B 27/0101* (2013.01); *G06F 3/012* (2013.01); *G02B 2027/0141* (2013.01); *G06T 2219/024* (2013.01); *G06T 2219/028* (2013.01)

(58) Field of Classification Search
None
See application file for complete search history.

(56) References Cited

U.S. PATENT DOCUMENTS

| | | | |
|---|---|---|---|
| 9,392,212 B1 * | 7/2016 | Ross | H04N 5/9305 |
| 2018/0041561 A1 * | 2/2018 | Davies | H04L 65/4076 |

* cited by examiner

*Primary Examiner* — Kenneth B Lee, Jr.
(74) *Attorney, Agent, or Firm* — Weaver Austin Villeneuve & Sampson LLP

(57) ABSTRACT

Techniques are described that facilitate co-viewing in an experiential reality environment such as a virtual reality or augmented reality environment. These techniques include prioritizing a main view of experiential reality content over side views of the experiential reality content.

21 Claims, 7 Drawing Sheets

CO-VIEWING IN VIRTUAL AND AUGMENTED REALITY ENVIRONMENTS

BACKGROUND

Virtual reality is a computer technology that replicates an environment, real or imagined, and simulates a user's physical presence in the environment and, in some cases, enables the user to interact with the environment. Typically, virtual reality content is displayed on a computer monitor or with a virtual reality device such as a virtual reality headset, which is also commonly referred to as a head-mounted display. The user may interact with the environment by interacting with the virtual reality device, through the use of a standard input device such as a keyboard or mouse, or through a multimodal device such as a wired glove. As the user interacts with the environment, three-dimensional (3D) images are provided by virtual reality software that accesses virtual reality content.

While virtual reality replaces the user's real world environment with a simulated one, augmented reality (AR) enhances the user's perception of reality. AR is a live view of a physical, real-world environment whose elements are augmented by computer-generated or extracted real-world sensory input such as sound, video, or graphics. AR techniques are typically performed in real time and in context with environmental elements. AR technology is often used to augment the user's real world environment by overlaying supplemental information over a real-world view or live video feed.

A number of streaming media services enable multimedia such as movies, television programs, and live media content to be streamed to client devices. However, since much more visual information needs to be available to simulate a user's presence in a 3D environment, streaming content such as virtual or augmented reality content is particularly challenging.

DETAILED DESCRIPTION

Figure 1A:
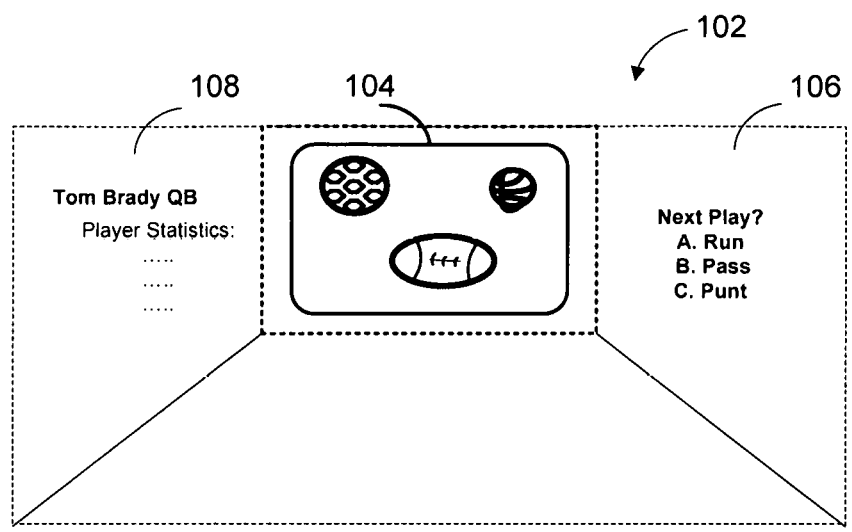
FIGS. 1A-1C together illustrate an example of an application of a particular implementation.

This disclosure describes techniques that facilitate co-viewing in an experiential reality environment. Experiential reality may refer to any technology that replicates an environment, real or imagined, or portion thereof and enables a user to interact with the environment. The environment or portion thereof may be displayed on a computer monitor or other display, which may be integral with an experiential reality device such as a head mounted display or handheld device. The user may interact with the environment by interacting with an experiential reality device, a multimodal device such as a wired glove, a standard input device such as a keyboard or mouse, or another form of input device or medium. As the user interacts with the environment, images are provided by software that accesses and decodes experiential reality content such as virtual reality content for display, as will be described in further detail below. Examples of experiential reality include virtual reality, augmented reality, or computer-mediated reality.

In the following description, various implementations are described with reference to a virtual reality environment that is rendered using software that decodes virtual reality content. However, these examples are merely illustrative. Therefore, the disclosed implementations may be employed in any experiential reality environment including, but not limited to, a virtual, augmented, or computer-mediated reality environment.

In accordance with various implementations, a virtual reality environment includes a main (e.g., front) view and one or more side views. The main view corresponds to content being independently viewed by two or more users via separate client devices, while at least one of the side views facilitates communication between the users while simultaneously "co-viewing" the main view. By prioritizing the main view over the side views, it is possible for the main view to be consistently presented to a viewer who may choose to view or interact with one of the side views while watching the main view.

In accordance with various implementations, a virtual reality environment is rendered by selectively decoding frames associated with the views of the virtual reality environment. More particularly, frames associated with views of the virtual reality environment not currently in view may be selectively decoded. Selective decoding may be performed according to whether a view that is not currently visible from a current position within the virtual reality environment is likely to become visible or to be of interest to a user within the virtual reality environment. Where it is determined that a non-visible view is likely to be of interest to the user, a signal may be transmitted to draw attention to the non-visible view.

In some implementations, virtual reality content is decoded such that reference frames for non-viewed portions of the virtual reality environment are decoded without decoding non-reference frames for the non-viewed portions of the virtual reality environment. When a non-viewed portion subsequently comes into view or is predicted to come into view, the non-reference frames are decoded. By decoding only a subset of the frames associated with non-viewed portions of the virtual reality environment, the virtual reality environment may be simulated at a client device with fewer disruptions to the rendering of the virtual reality content as the user changes position within the virtual reality environment.

In some implementations, a device buffer of a client device is allocated among the main view and side-views. More particularly, a majority of the device buffer may be allocated to the main view while the remainder of the device buffer may be divided among the side-views. Such allocation may be performed statically or dynamically. In this manner, the main view can be preserved while limiting the total bandwidth consumed by the side views in the event that the client device experience a reduced bandwidth.

Selective decoding and/or selective downloading of frames can be performed, as will be described in further detail below. Selective decoding and/or downloading of frames can be performed according to a particular device buffer distribution. In some implementations, selective decoding and/or selective downloading of frames can be performed only during periods when the available bandwidth is insufficient to simultaneously render the main view and side-views.

Telecommunications networks and other content services commonly stream video to client devices for display on televisions and computer monitors. With the increase in availability of three-dimensional (3D) virtual reality content, some content services offer the streaming of 3D virtual reality content. Since the virtual reality content offers a user the ability to view their virtual environment from a number of viewer-selected perspectives, the amount of data that is typically streamed to offer this capability is significant.

To generate a 3D virtual reality environment, a virtual cube, cylinder, or other three-dimensional shape is typically used to display images of the virtual reality environment as they would be perceived by a user within the virtual reality environment. For a given user position or perspective within the virtual reality environment, there will often be 6 (or more) possible views corresponding to the faces of the three-dimensional shape, which can be rendered separately or simultaneously. More particularly, an image may be generated and displayed for each of the faces of a virtual cube, cylinder, or other three-dimensional shape that would be visible from the perspective of the user within the virtual reality environment at a given point in time. Therefore, a virtual reality environment is typically rendered using 6 (or more) independent video streams.

Generally, when a user interacts with a virtual reality environment, the user's change in position and/or perspective is detected by the client device and frames of the virtual reality content that reflect the user's changed perspective are then downloaded and decoded by the client device. These frames typically correspond to the video streams for all faces of the virtual three dimensional object used to simulate the virtual reality environment at the user's new position. Since the number of frames that are downloaded to the client device and decoded can be substantial and the frames are downloaded and decoded after the user's changed position is detected, the available bandwidth and processing resources may be insufficient to generate and display images at the speed with which the user's position within their virtual environment changes. As a result, the user can perceive disruptions to the video rendered at the client device. This can be particularly problematic where content rendered within a "main" view is disrupted during a co-viewing experience.

In some implementations, content can be selectively decoded to reduce the likelihood of disruptions during co-viewing in a virtual reality environment. This may be accomplished, for example, by decoding reference frames for non-visible views. Reference frames are frames of a compressed video that are used to define other frames. As such, they are only used in inter-frame compression techniques. In older video encoding standards, such as MPEG-2, only one reference frame—the previous frame—was used for P-frames. Two reference frames (one past and one future) were used for B-frames.

Some modern video encoding standards, such as H.264, allow the use of multiple reference frames. As a result, some videos may have large numbers of reference frames. When decoding, reference frames are typically stored in memory until they are no longer needed for further decoding. This can considerably raise the memory usage of the decode for videos with large numbers of reference frames.

Figure 1B:
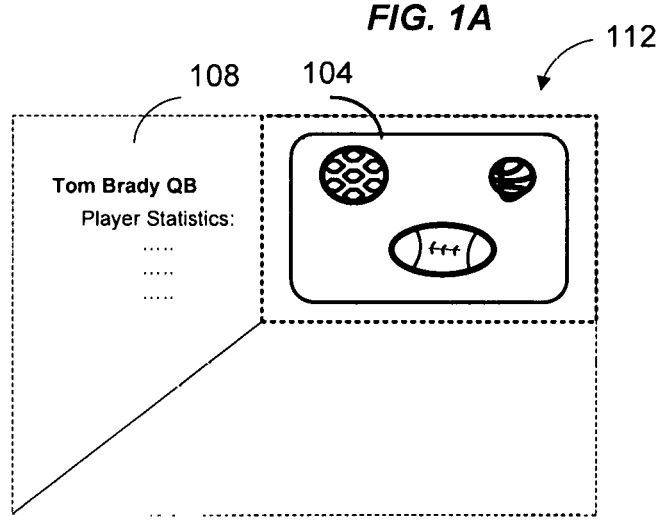
Figure 1C:
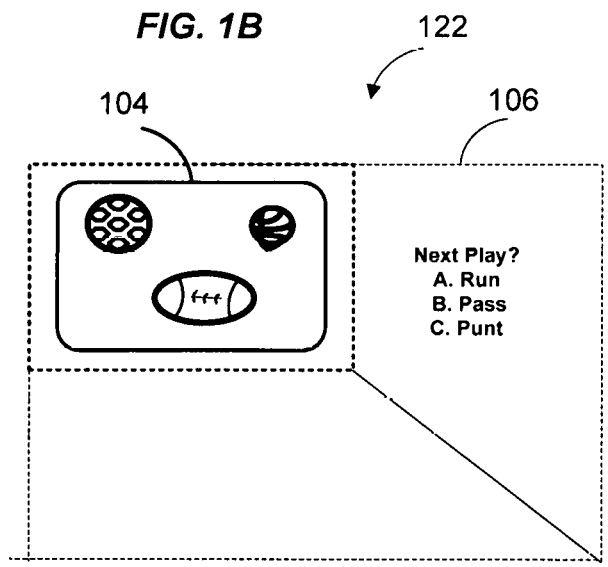

FIGS. 1A-1C together illustrate an example of an application of a particular implementation. In this example, virtual reality software installed on a virtual reality device enables a user to participate in a virtual reality co-viewing experience.

FIG. 1A illustrates an example of a view of a virtual reality environment experienced by a user holding or wearing a virtual reality device. As shown at 102, as the user looks through the virtual reality device, the user sees a main view 104. In this example, there are three views that are available to the user, which correspond to three faces of a virtual cube. As depicted in FIG. 1A, the views that can be visible to the user include main view 104 and side views including left-side view 106 and right-side view 108. Depending upon the position/perspective of the user, one or more of the views may be visible to the user at any given point in time.

The main view 104 can correspond to media content including virtual reality video-on-demand (VOD) content or broadcast content (e.g., 3D video of live events). As shown in this example, the view can correspond to a National Football League (NFL) game or soccer game. A co-viewing experience between or among two or more users simultaneously viewing the same media content in the main view 104 using different client devices can be facilitated by at least one of the side views. In this example, right-side view 106 is a virtual pane that facilitates interaction between or among two or more users. As shown in FIG. 1A, right-side view 106 represents a mini game being played between the user and another user using a different device, which may include a virtual reality device, tablet, or other suitable device. View 106 can include a single frame or a video. For example, view 106 can include a list of questions pertaining to the main view 104 that can be answered by the co-viewing users and the user who guesses the answer correctly wins the game. As another example, view 106 can include an avatar or video representing another user who is participating in the co-viewing experience.

In some implementations, one of the side views provides information pertaining to the main view 104. For example, left-side view 108 can include statistics or other data that pertains to the content rendered within the main view 104. More particularly, the left-side view 108 can include information provided by Amazon's X-Ray feature or another reference tool. During a live broadcast such as a football game, this information can include information pertaining to a specific player (e.g., Tom Brady) such as their statistics for the season, their current position on the field, etc.

In the event that the available bandwidth is insufficient to simultaneously render the main view and the side views, the co-viewing experience of the users may be impacted. In accordance with various implementations, for portions (e.g., side views) of virtual reality content that are not currently in view from the user's current position within the virtual reality environment, decoding can be delayed until the portion of virtual reality content is in view or likely to be in view. In some implementations, for views (e.g., side views) not currently in view, decoding can be performed for reference frames without decoding non-reference frames. As a portion (e.g., side view) of the virtual reality content comes into view, non-reference frames can be decoded. Therefore, images may be presented while reducing the amount of data that is stored and processed at the virtual reality device As shown in FIG. 1A, while the user is looking straight ahead, the left-side view 108 and right-side view 106 are not visible to the user. In accordance with various implementations, selective decoding is performed for non-visible views (e.g., side views). In some implementations, selective decoding is performed only for non-visible views (e.g., side views) that include video content. Where a side view consists of a single frame, the frame may be decoded without delay.

In accordance with various implementations, the virtual reality software may decode reference frames for side views that are not currently in view from the position/perspective of the user. More particularly, the virtual reality software may decode, while views 106 and 108 are not visible, reference frames for the left-side view 108 and right-side view 106, without decoding non-reference frames for the left-side view 108 or right-side view 106.

As shown at 112 of FIG. 1B, as the user rotates left while holding or wearing the virtual reality device, the user's perspective within the virtual reality environment changes. More particularly, the left-side view 108 becomes visible, while the right-side view 106 moves out of view. The virtual reality device detects the user's change in position/perspective. Since the virtual reality software has already decoded the reference frames for the view corresponding to the left-side view 108, the virtual reality software decodes the corresponding non-reference frames. The virtual reality software may continue decoding both the reference and non-reference frames from that point in time forward. Therefore, the device renders an image that reflects the user's change in position/perspective using the relevant reference and non-reference frames.

Similarly, as shown at 122 of FIG. 1C, as the user rotates right while holding or wearing the virtual reality device, the user's perspective within the virtual reality environment changes. More particularly, the right-side view 106 becomes visible, while the left-side view 108 moves out of view. The virtual reality device detects the user's change in position/perspective. Since the virtual reality software has already decoded the reference frames corresponding to the right-side view 106, the virtual reality device decodes the non-reference frames and renders an image that reflects the user's change in position/perspective using the relevant reference and non-reference frames. In some implementations, since the left-side view 108 is no longer visible, the virtual reality device may discontinue decoding the corresponding non-reference frames until the virtual reality device determines that the left-side view 108 is likely to come into view. Therefore, the visible portions of the virtual reality content can be rendered as they come into view without delays or disruptions.

In this example, the side views consist of a left-side and right-side view. However, in other implementations, further views such as a rear view, top view, and/or bottom view may be rendered. For example, where the user continues to rotate, a rear view (not shown) may come into view. The term "side view" as used herein refers to any view other than the main (or front) view.

In some instances, the user may change his or her location within the virtual reality environment by "node jumping." This may occur, for example, where the user presses a button on a virtual reality device or moves his or her head while wearing a virtual reality headset. Frames including reference frames and non-reference frames may be decoded to simulate the user's presence at this new location within the virtual reality environment.

The example described above pertains to decoding of virtual reality content during co-viewing within a virtual reality environment. In accordance with various implementations, virtual reality content may also be selectively downloaded. For example, reference frames corresponding to non-visible views may be downloaded without downloading corresponding non-reference frames. In some implementations, downloading may be performed according to a distribution of a buffer among the views. Therefore, images may be rendered rapidly while preserving the main view and minimizing the amount of data that is downloaded and stored at the virtual reality device.

Figure 2:
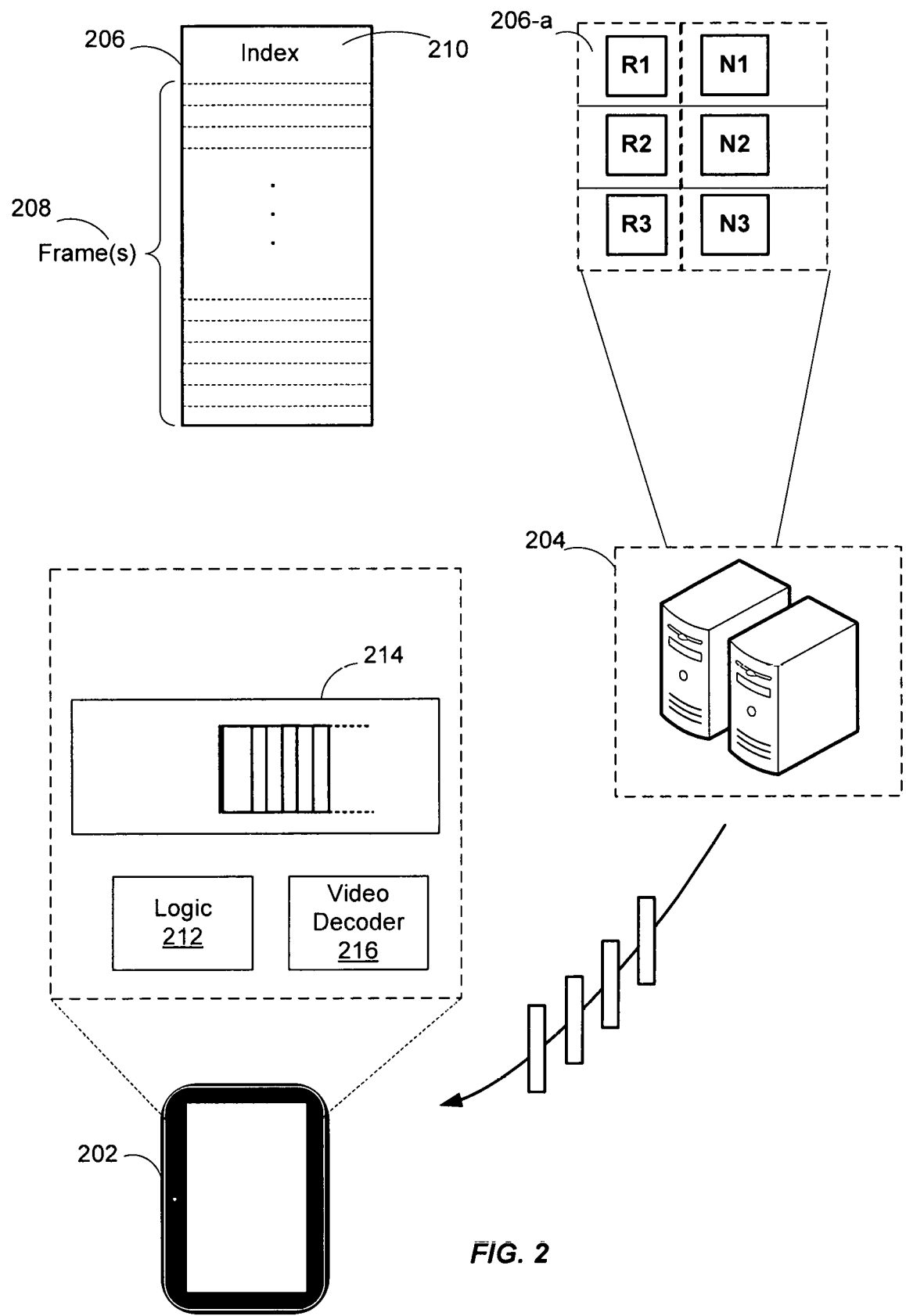
FIG. 2 illustrates the operation of an example of a particular implementation.

FIG. 2 illustrates the operation of an example of a particular implementation. A user of client device 202 may select content to be rendered within a main view. In some implementations, the user selects live content from service 204. Alternatively, the user may select a title from a catalogue of titles available from service 204. The user may also select content to be rendered within at least one of the side views. These selections may be performed prior to or during streaming of the selected main view content. Service 204 may generate a combined stream that includes the selected content for the main view and additional selected content corresponding to the side view(s). The combined stream may be referred to as virtual reality content. Content service 204 streams the virtual reality content to client device 202.

The streaming of virtual reality content to client device 202 is facilitated by virtual reality software installed on client device 202. The virtual reality software operates to provide 3D virtual reality content via a display that is integrated with client device 202 (as shown) or coupled to client device 202, as will be described in further detail below.

Service 204 may maintain files associated with content available from service 204 that enable virtual reality content to be streamed to client devices using service 204. In this example, service 204 selects file(s) 206 or fragments thereof that are relevant to the user selections. For example, file(s) 206 or fragments thereof may include live media content (e.g., corresponding to a football game), x-ray information (e.g., pertaining to football player(s)), games that co-viewers can play with one another (e.g., predicting the next move of a football player), etc.

File 206 may be a video file that includes frames 208 that have been encoded by a video encoder that operates according to a video encoding standard such as H.264 or H.265. In some implementations, file 206 may include content that has been generated and encoded dynamically.

As shown in FIG. 2, each file 206 can include one or more media fragments. Each media fragment can include a fragment index 210 and frame(s) 208. In this example, file 206-*a* corresponding to the user selections can include a plurality of sets of frames, where each set of frames corresponds to a different one of a plurality of views of the virtual reality content from a particular position or perspective in the virtual environment. More particularly, each set of frames may correspond to a different face, side, or view of a three-dimensional shape such as a cube or cylinder centered on or including that position. Each set of frames includes one or more frames. For example, a set of frames may be a sequence of frames that includes one or more reference frames and one or more non-reference frames. To simplify the example, each set of frames is shown to include a single reference frame and a single non-reference frame, which are denoted by R and N, respectively. As shown at 206, three sets of frames corresponding to three faces of a virtual cube are represented by frames R1-N1, R2-N2, R3-N3, where R1-N1 corresponds to the main view, R2-N2 corresponds to the left-side view, and R3-N3 corresponds to the right-side view. A reference frame is a frame of a compressed video that is used to define other frames, while a non-reference frame is a frame that is not used to define other frames.

While only three sets of frames, corresponding to the main and side views, are shown in this example, it is important to note this example is merely illustrative. Therefore, the file can also include additional sets of frames corresponding to the remaining faces of the virtual cube.

In one implementation, the virtual reality content contained within a file is encoded according to a scalable encoding standard such as the Scalability extension of High Efficiency Video Coding (HEVC), which is commonly referred to as SHVC. Each view of the virtual reality environment may have corresponding base layer(s) and enhancement layer(s). More particularly, the base layer(s) may include the reference frames for the corresponding view, while the enhancement layer(s) may include the non-reference frames for the corresponding view.

Each fragment of encoded virtual reality content includes several frame types; with the frame type defining the kind of dependency allowed for that frame. In general, dependencies between frames are used to support data compression, i.e., understanding how frames before or after a frame are similar allows encoding only the differences between nearby frames in the same fragment, resulting in significant improvements in bit rate.

An I-frame, or intra frame, is a self-contained frame that can be independently decoded without reference to preceding or upcoming images. The first image in a video sequence is always an I-frame and these frames act as starting points if the transmitted bit stream is damaged. Therefore, each I-frame can be identified as a reference frame.

A P-frame, which stands for predictive inter frame, references earlier I- or P-frames to encode an image. A B-frame, which stands for bi-predictive inter frame, is a frame that references both an earlier reference frame and a future frame. A P-frame may only reference preceding I- or P-frames, while a B-frame may reference both preceding and succeeding I- or P-frames. Encoding standards such as H.264 provide further encoding options that enable a B-frame to be referenced by a P-frame or a B-frame. Therefore, it is possible for a P-frame or B-frame to be a reference frame or non-reference frame.

In one implementation, content service 204 provides information pertaining to the fragments of the virtual reality content to client device 202. For example, content service 104 may provide a manifest file that indicates locations (e.g., URLs and/or byte offsets) at which the fragments or portions thereof can be accessed. Client device 202 can use the manifest to download fragments or portions thereof. For example, client device 202 can download a fragment header including a fragment index that can be used to download frames, as will be described in further detail below.

Logic 212 of client device 202 may download video fragment(s) from content service 204 and store the fragment(s) in memory 214 (or buffer). Alternatively, logic 212 may selectively download frames of the video fragments from content service 204 and store the frames in memory 214. In one implementation, reference frames for views that are not visible from the current position/perspective may be downloaded without downloading non-reference frames for the views. When a non-visible view subsequently becomes visible or is likely to become visible, corresponding non-reference frames may be downloaded. In this example, reference frames R1-R3 are downloaded, while non-reference frames N1-N3 corresponding to the views are downloaded as the corresponding views become or are likely to become visible.

In some implementations, as logic 212 selects reference frames and/or non-reference frames for decoding, logic 212 provides the selected frames to a video decoder 216. More particularly, logic 212 selects reference frames for views that are not currently visible. For those views that are visible, logic 212 selects non-reference frames. If reference frames associated with a currently visible view have not already been decoded, logic also selects reference frames for the view. Video decoder 216 decodes the frames to generate the corresponding digital images representing the various views of the virtual reality environment, as described herein.

In this example, reference frames R1-R3 are decoded, while non-reference frame N1 corresponding to the currently visible main view is decoded. As the user rotates his or her head left or right, non-reference frames N2, N3 corresponding to the left-side view and right-side view are decoded.

Logic 212 may download and/or decode frames according to a predictive model. In one implementation, logic 212 applies a predictive model to predict views most likely to be selected or viewed next (e.g., within a period of time) by the user. In some implementations, logic 212 applies a predictive model to predict views or portions thereof most likely to be of interest to the user and may provide a notification to the user that a particular view or portion thereof is likely to be of interest. In some implementations, the predictive model is applied to side views, while all frames of the main view are downloaded and decoded.

In some implementations, logic 212 downloads and/or decodes frames according to an allocation of buffer 214 among the views. For example, allocation of a majority of the buffer 214 to the main view may enable all frames associated with the main view to be downloaded and decoded, while the remaining buffer space allocated to the side views may impact the ability to download and/or decode frames associated with the side views. By applying a predictive model as described above, logic 212 may enable the limited buffer space allocated to the side views to be effectively managed.

Figure 3:
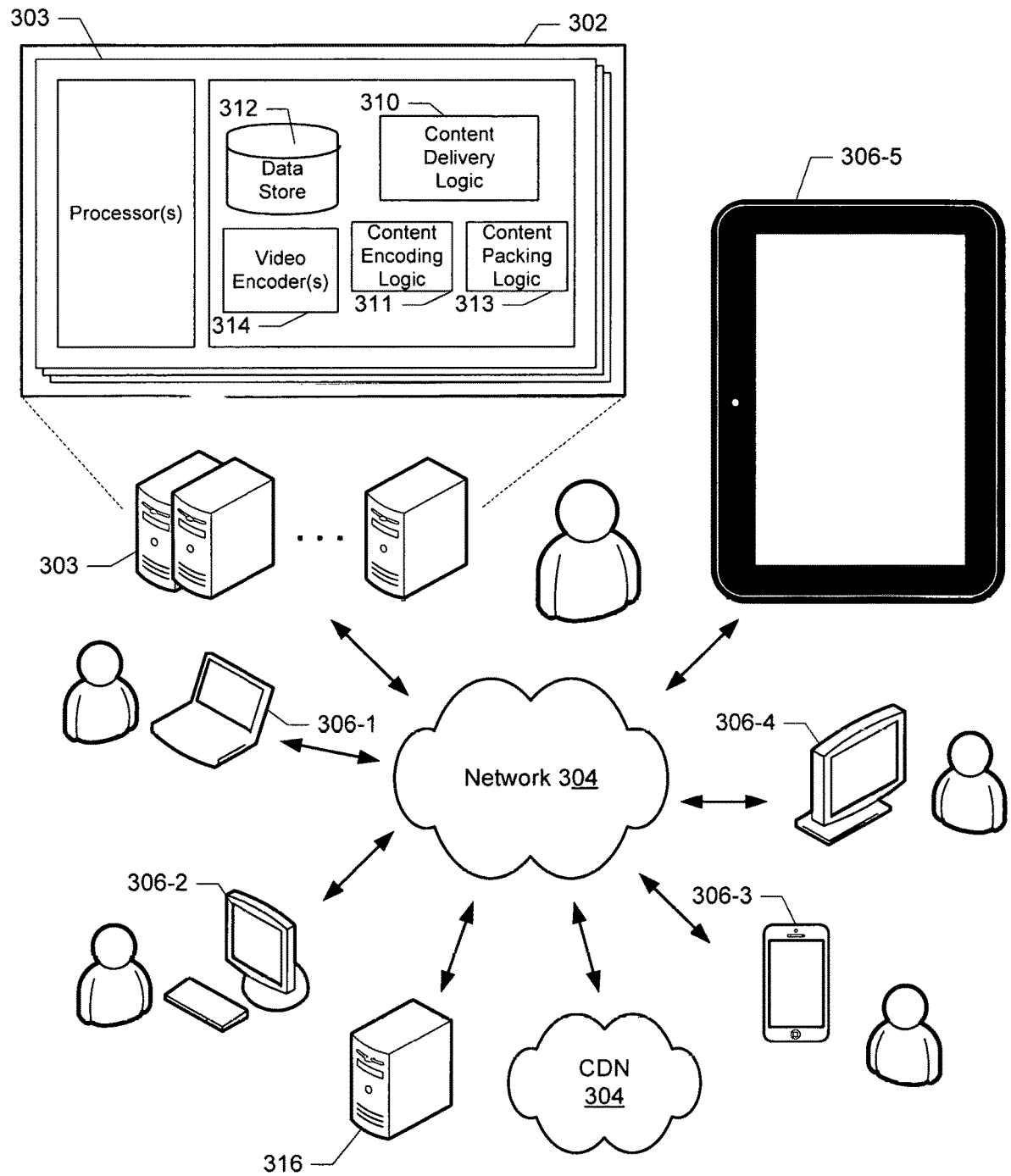
FIG. 3 is a simplified diagram of a computing environment in which various implementations may be practiced.

FIG. 3 illustrates an example of a computing environment in which a service 302 such as a content service provides virtual reality content via network 304 to a variety of client devices (306-1 through 306-5) in accordance with the techniques described herein. More particularly, the content may include virtual reality video-on-demand (VOD) content and/or broadcast content (e.g., 3D video of live events).

Content service 302 includes content delivery logic 310 which facilitates various aspects of content delivery to client devices 306. Content service 302 may conform to any of a wide variety of architectures such as, for example, a services platform deployed at one or more co-locations, each implemented with one or more servers 303. Network 304 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 306 may be any suitable device capable of connecting to network 304 and downloading or consuming streams of VOD or broadcast content provided by service 302. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches, smart glasses, or virtual reality headsets), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling content service 302. Alternatively, such resources may be independent of content service 302, e.g., on a platform under control of a separate provider of computing resources with which content service 302 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 302 is described as if it were integrated with the platform(s) that provides the content to client devices. However, it will be understood that content service 302 may provide access to content in conjunction with one or more content delivery networks (e.g., CDN 304) that may or may not be independent of content service 302. In addition, the source of the content may or may not be independent of content service 302 (e.g., as represented by content provider server 316).

Implementations enabled by the present disclosure contemplate logic and video decoder(s) resident on the client devices consuming content from content service 302; such logic and video decoder(s) being configured to download and decode frames of 3D virtual reality video files as described herein and display the resulting images. The logic and/or decoder(s) might be part of an existing algorithm or module on the client device or implemented to work in conjunction with such an algorithm or module. The logic and/or decoder(s) might be implemented, for example, in a media player on the client device, as a browser plug-in, or as a separate application or module resident on the client device.

Implementations are also contemplated in which, in addition to content delivery logic 310 (which facilitates various aspects of content delivery to client devices 306), content service 302 may include logic that facilitates at least some aspects of the encoding of content as described herein (e.g., as represented by content encoding logic 311). Encoding logic 311 might encode content including live media content it receives from content providers such as content provider server 316. Encoding logic 311 may use encoding parameters to encode fragments of media content at various bitrates. For example, live media content may be encoded at a bitrate of 3,200 kbps and at a bitrate of 2,400 kbps. Encoding logic 311 can use a variety of variable bitrate encoding techniques including single-pass encoding, multi-pass encoding, constrained variable bitrate encoding, content type variable bitrate encoding, and any other lossless and/or lossy encoding technique that meets an encoding standard (e.g., MPEG-2, H.264, HEVC/H.265, etc.).

The frames associated with virtual reality content may be encoded according to a particular video encoding standard or multiple encoding standards. More particularly, encoding logic 311 can employ one or more video encoders 314, where each video encoder 314 operates according to a different video encoding standard. In one implementation, video encoder 314 is configured to encode virtual reality content according to an encoding standard such as H.264 or H.265. In some implementations, video encoder 314 operates according to a scalable video encoding standard such as SHVC. As will be appreciated, video encoding can be implemented in software and/or hardware.

In some implementations, content service 302 also includes content packing logic 313. Content packing logic 313 may pack encoded frames in a particular order or pattern to facilitate the downloading and/or decoding of frames associated with a particular fragment or view. In one implementation, content packing logic 313 may pack frames such that frames are grouped according to frame type (e.g., I-frame, B-frame, P-frame, reference B-frame, reference P-frame, non-reference B-frame, non-reference P-frame). The grouping may correspond to a particular order or pattern. Since the order or pattern may be identified from a fragment index, a client device may use this order or pattern to selectively download and decode frames of a particular frame type.

In one implementation, content packing logic 313 may pack encoded frames in an order that corresponds to the reference hierarchy of the corresponding fragment index. By using the reference hierarchy, content packing logic 313 may pack the frames in the order in which the frames will be downloaded and decoded. Therefore, reference frames of a fragment may be downloaded and/or decoded prior to non-reference frames of the same fragment.

In accordance with various implementations, virtual reality content is streamed in the form of base layers and enhancement layers. Content packing logic 313 may pack the frames of virtual reality content such that reference frames are packed in base layer(s) and non-reference frames are packed in enhancement layer(s). Therefore, a client device may easily identify and retrieve reference frames by accessing frames in the base layer(s).

In addition to providing access to content, content service 302 may also include a variety of information related to the content (e.g., manifests or other metadata) in data store 312 to which service 302 provides access. Alternatively, such information about the content, as well as the content itself may be provided and/or hosted by one or more separate platforms, e.g., CDN 304. It should be noted that, while logic 310, 311, and 313, video encoder 314, and data store 312 are shown as integrated with content service 302, implementations are contemplated in which some or all of these operate remotely from the associated content service, and/or are under the control of an independent entity. From these examples, those of skill in the art will understand the diversity of use cases to which the techniques described herein are applicable.

Figure 4:
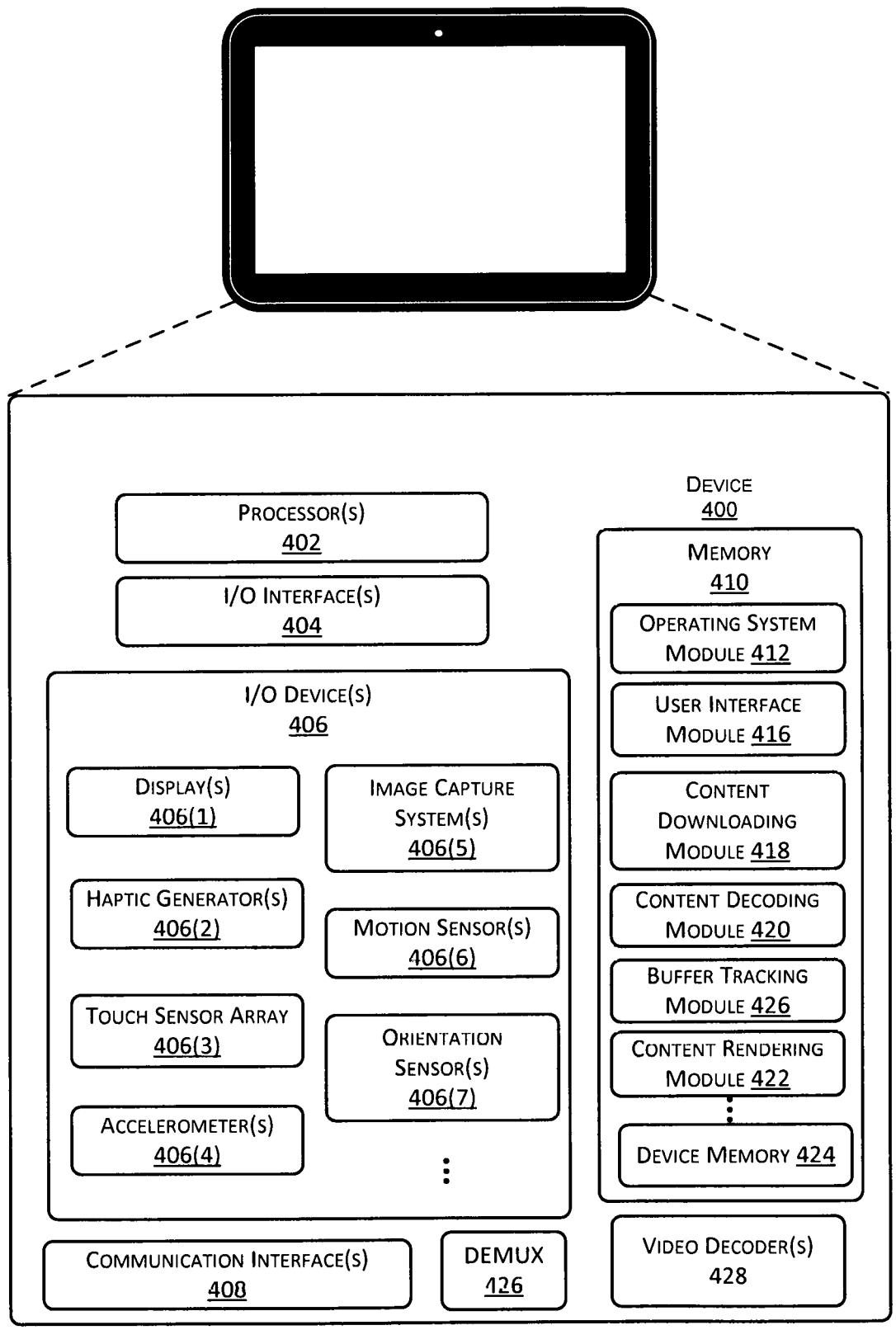
FIG. 4 is a simplified diagram of an example of a client device with which various implementations may be practiced.

A block diagram of an example of a client device 400 suitable for use with various implementations is shown in FIG. 4. Device 400 includes one or more single or multi-core processors 402 configured to execute stored instructions (e.g., in device memory 424). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-242 interface, a media device interface, and so forth. I/O interface(s) 404 is coupled to one or more I/O devices 406. The I/O device(s) 406 may include one or more displays 406(1), one or more haptic generators 406(2), a touch sensor array 406(3), one or more accelerometers 406(4), one or more image capture systems 406(5), one or more motion sensors 406(6), one or more orientation sensors 406(7), microphones, speakers, and so forth.

User interaction with the virtual reality environment may be detected via one or more of the I/O devices 406. For example, a position or perspective of a user in relation to his or her virtual reality environment may be detected via one or more of the I/O devices 406. Based upon the current position or perspective (e.g., angle) of the user within the virtual reality environment, device 400 may identify the portions (e.g., views) of the virtual reality environment that are visible from the current position/perspective and the portions of the virtual reality environment that are not visible from the current position/perspective.

Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G or 4G cellular network, a WiFi-LAN and a Bluetooth PAN. Device 400 also includes one or more buses or other internal communications hardware or software (not shown) that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules and other data for the operation of device 400. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 410 includes at least one operating system (OS) module 412 configured to manage hardware resources such as I/O interfaces 404 and provide various services to applications or modules executing on processor(s) 402. Memory 410 also includes a user interface module 416, content downloading module 418, content decoding module 420, content rendering module 422, and other modules.

Content downloading module 418 downloads entire media fragments or specific frames from content service 204, as described herein. In some implementations, content downloading module 418 downloads reference frames corresponding to non-visible views. In a particular implementation, content downloading module 418 downloads frames of base layer(s) of the virtual reality content. For example, a predictive model may be applied to select the non-visible views for which to download reference frames. Content downloading module 418 may subsequently download non-reference frames as non-visible views become visible, are determined to have a high probability of becoming visible, or are determined to have a high probability of being of interest to a user of the device. For visible views, frames including reference and non-reference frames may be downloaded. In one implementation, the non-reference frames may be downloaded from enhancement layer(s) of the virtual reality content.

Content decoding module 420 selects frames to decode and sends the selected frames to a video decoder 248. More particularly, content decoding module 420 may decodes reference frames for non-visible views, as will be described in further detail below. In some implementations, content decoding module 420 applies a predictive model to selectively decode reference frames that have been downloaded. Content decoding module 420 may subsequently decode non-reference frames as non-visible views become visible, are determined to have a high probability of becoming visible, or are determined to have a high probability of being of interest to a user of the device. For visible views, frames including reference and non-reference frames may be decoded. Content rendering module 422 may render virtual reality content based on the decoded frames for the portions of the virtual reality environment that are in view.

In accordance with various implementations, the main view (e.g., front view) is prioritized such that it is continuously treated as a visible view. As a result, all frames associated with the main view may be downloaded and decoded as they are received from content service 302.

In some implementations, a device buffer is allocated among the views. For example, a majority of the device buffer may be allocated to the main view, while the remainder of the device buffer may be divided among the remaining views. Each view may have a corresponding buffer threshold that indicates an amount of the buffer allocated and available to the view.

The content downloading module 418 and/or content decoding module 420 may operate based, at least in part, on the buffer allocation among the views. More particularly, the content downloading module 418 may request fragments or portions thereof based, at least in part, on whether the buffer threshold associated with a particular view will be exceeded. For example, the content downloading module 418 may request a side view fragment at a bitrate of 2,400 kbps, but may request a main view fragment at a bitrate of 3,200 kbps. In this manner, the client device can ensure that content that is downloaded for a particular view does not exceed the allotted buffer space.

In some implementations, a buffer tracking module 426 tracks the buffer thresholds corresponding to the different views and communicates with the content downloading module 418 regarding the optimal next steps for downloading content corresponding to one or more of the views. Each of the buffer thresholds may indicate a corresponding amount of buffer space (e.g., memory) available to the corresponding view. The buffer tracking module 426 may consider a number of factors in determining the next step(s) for a given view. For example, the buffer tracking module 426 may consider priorities assigned to the views, available bit rates for the view, buffer allocation among the views, the amount of buffer space available to the view based upon the corresponding buffer threshold, whether the view is coming into view or is likely to come into view, and/or the size of the corresponding file or fragment. The buffer tracking module 426 may determine that the next step for the view is to request a file or fragment at a particular bit rate, download a particular file, fragment, or portion thereof, or delay downloading a particular file or fragment.

Video decoder 428 includes software and/or hardware (e.g., electrical components or a circuit) configured to decode frames of video content files according to a corresponding video encoding standard such as H.264 or H.265. In one implementation, video decoder 428 operates according to a scalable encoding standard such as SHVC. A demultiplexer (DEMUX) 426 may demultiplex frames of fragments and pass the demultiplexed frames to decoder 428 for decoding.

Memory 410 also includes device memory 424 to store a wide variety of instructions and information using any of a variety of formats including, for example, flat files, databases, linked lists, trees, or other data structures. Such information includes content for rendering on display 406(1) including, for example, any type of video content (e.g., frames, fragments, or video files). In some implementations, a portion of device memory 424 may be distributed across one or more other devices including servers, network attached storage devices, and so forth.

The logic or computer program instructions used to support the downloading, decoding, and rendering of virtual reality content may be implemented in a variety of ways. For example, at least some of this functionality may be implemented as part of the code of a media player operating on device 400. Alternatively, at least some of this functionality may be implemented separately from and interact with the device's media player, web browser, mobile app, decoder, etc. The range of possibilities will be understood by those of skill in the art with reference to the following description.

It will also be understood that device 400 of FIG. 4 is merely an example of a device with which various implementations enabled by the present disclosure may be practiced, and that a wide variety of other device types including, for example, virtual reality headsets may also be used. The scope of this disclosure should therefore not be limited by reference to device-specific details.

Figure 5:
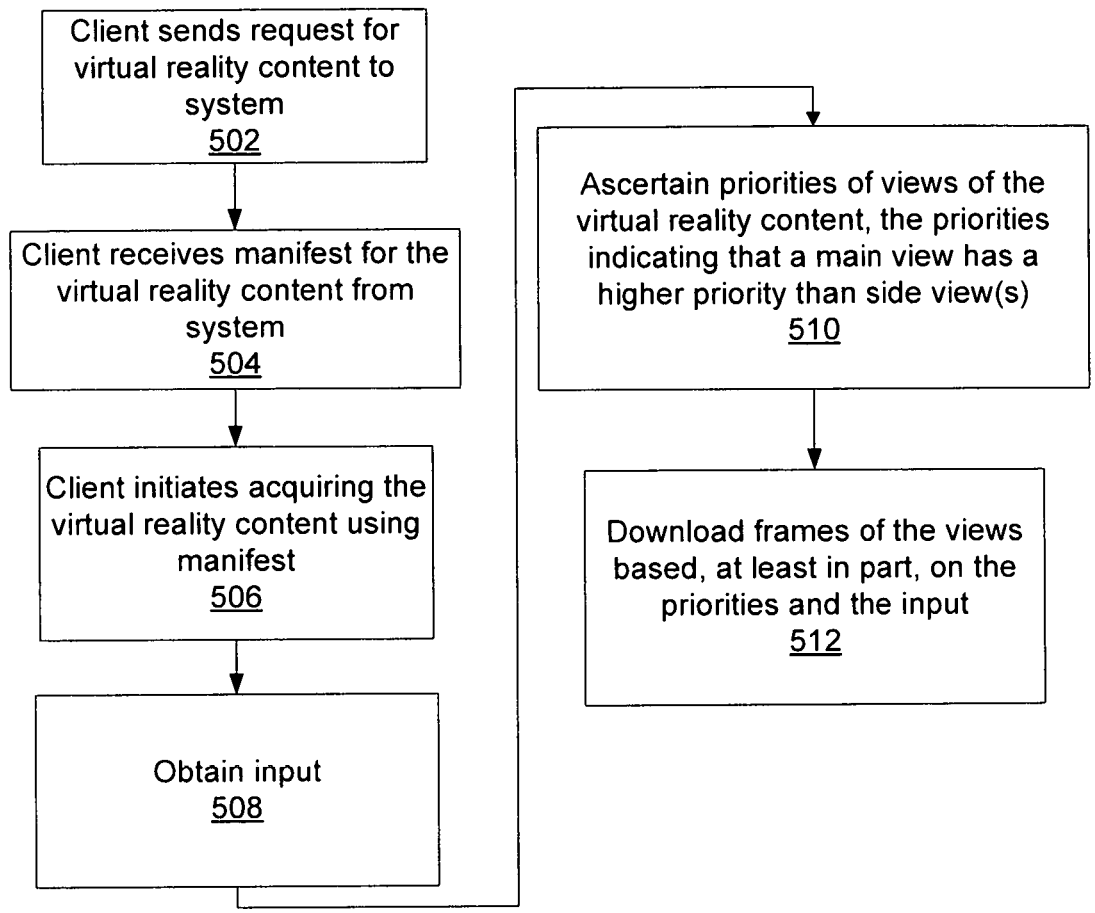
FIG. 5 is a flowchart illustrating a method of downloading virtual reality content according to a particular implementation.

FIG. 5 is a flowchart illustrating a method of downloading virtual reality content according to a particular implementation. A user may connect with a system offering a service such as a content service (or associated web site) via the Internet using a client device and browse a catalogue of content items offered by the service. The content items can include virtual reality content items, video-on-demand (VOD) or broadcast content (e.g., scheduled content or content being generated and delivered in real time).

Access to content over the Internet is typically governed by a digital rights management system such as Google's Widevine, Microsoft's PlayReady, Apple's FairPlay, or Sony's OpenMG to name a few representative examples. Content may be encrypted using any of a variety of encryption technologies including, for example, various Advanced Encryption Standard (AES) and Elliptic Curve Cryptography (ECC) encryption techniques. The content may also be delivered using an adaptive bit rate streaming technique such as, for example, MPEG-DASH (Dynamic Adaptive Streaming over HTTP), Apple's HLS (HTTP Live Streaming), or Microsoft's Smooth Streaming, to name a few representative examples. It should be noted that the techniques described herein are compatible with a wide range of content services, media players, DRM systems, encryption technologies, and streaming technologies, the details of which are known to those of skill in the art. The nature and operation of these technologies will therefore not be described in detail to promote clarity.

Referring now to FIG. 5, the user may connect to the system by completing a login process using the client device and, after selecting content such as a football game from a catalogue of content, the client device sends a request to the system for content (502). As the user selects further content, the client device may send additional requests to the system. For example, where the user wishes to view player information for a football player in the game being viewed, the user can access an X-ray feature using the client device. As another example, where the user wishes to interact with another player, the user can access a co-viewing feature. Content for these different streams can be combined to generate one or more files. The combined streams may be referred to as virtual reality content. For example, the game may be rendered within a main (e.g., front) view, player information provided by the X-ray feature can be rendered within a first side view (e.g., left side view), and information provided by a co-viewing feature can be rendered within a second side view (e.g., right side view).

The system provides the client device with the information the client device needs to acquire the content. This may include, for example, content metadata and information about where the client can request the fragments of the selected content at various resolutions (e.g., a manifest). For example, the system may provide the client device with a manifest that the client device can use to acquire fragments (also referred to as a group of pictures or GOP) or frames of the content file(s) that include the virtual reality content (504). A manifest file may detail fragments, or segments of time, of the media content available at different quality levels. Each fragment (also referred to as a group of pictures or GOP) may start with an index that identifies the frames of the fragment, the reference hierarchy (i.e., representing the dependencies between or among frames), and the offset of each frame in the file. The index may be provided in a header of a fragment. For example, this index is in the Movie Fragment ("moof") box of a media container file based on the ISO Base Media File Format, e.g., a the Common File Format (CFF) file, a Common Media Format (CMF) file, or an MP4 format file. As will be appreciated, these are merely examples of file types that may be used with implementations enabled by the present disclosure.

The client device can initiate acquiring the virtual reality content of the content file(s) using the manifest received from the system (506). More particularly, the client device can download entire media fragments. Alternatively, the client device can download the indices (e.g., headers) of the media fragment(s) of the video content files so that frames may be selectively downloaded.

The manifest and/or the fragment index may be used to access frame(s) for a particular view. More particularly, the manifest or fragment index may indicate the location (e.g., offset) of specific frame(s), reference frames, non-reference frames, and/or frames of a particular frame type within a fragment for a particular view. In one implementation, for each fragment, the manifest identifies specific view(s), as well as byte ranges for groups of frames (e.g., groups of reference frames, groups of non-reference frames, or frames of a particular frame type).

In accordance with various implementations, each fragment index includes a reference hierarchy that indicates dependencies among the frames within the fragment. More particularly, the reference hierarchy may indicate those frames that are reference frames (e.g., I-frames, reference P frames, reference B frames), as well as those frames that are non-reference frames (e.g. non-reference P frames, non-reference B frames).

The client device may parse the reference hierarchy for a fragment to determine the dependencies between and among the frames of the fragment. Dependency information that indicates the dependencies among frames of a fragment (or portion thereof) may be maintained in the form of a tree or other suitable data structure.

Input detected or received via I/O device(s) of the client device may be obtained (508). More particularly, the input may indicate a position or perspective (e.g., viewing angle) of a user in relation to their virtual environment. For example, the input may be received or detected via sensors such as touch sensor array(s), accelerometer(s), image capture system(s), a motion sensor(s), orientation sensor(s), and/or a microphone. As another example, the input may be obtained from an external I/O device such as a wired glove. Upon detecting the current position or perspective, the client device can identify views that are most pertinent to the user's current position/perspective.

Each view may correspond to one or more frames. For example, a game rendered in the main view may correspond to a video including a sequence of frames. As another example, player information provided by the X-ray feature may consist of a single frame. As yet another example, a co-viewing feature may render a single frame corresponding to a game being played by co-viewers or may render a sequence of frames corresponding to a live feed including a representation of one of the co-viewers.

Bandwidth constraints can negatively impact the co-viewing experience. This can be particularly problematic where two or more views each have a corresponding sequence of frames for which downloading and decoding can consume a significant amount of resources. The methods described in further detail below may eliminate delays and visual artifacts that can result from processing sequences of frames associated with multiple views.

In one implementation, the virtual reality content includes two or more possible views. More particularly, the views of the virtual reality environment may include, for at least one position or perspective within the virtual reality environment, multiple views (e.g., corresponding to faces of the three-dimensional cube or cylinder). At least one of the views of the virtual reality environment may correspond to a sequence of frames including both reference frames and non-reference frames. For example, the main view can include a sequence of frames, while the remaining views may include a single frame or a sequence of frames. The sequences of frames for the various views may be synchronized in time.

In accordance with various implementations, the views (e.g., main and side views) have associated view priorities. For example, the main view may be assigned the highest priority while the side views may be assigned lower priorities. In some implementations, the view priorities may be associated with corresponding buffer thresholds. More particularly, each view may have an associated buffer threshold that indicates an allocated portion of the buffer to the view.

Priorities of the views may be ascertained (510). The priorities may indicate an order in which frames associated with the views are to be downloaded and/or decoded. The priorities may be represented numerically or in the form of an ordered list. In addition, the priorities may correspond to a buffer allocation among the views.

Priorities may be assigned statically or dynamically. As described above, the main view may have a higher priority than the side views to ensure that the content being co-viewed is transmitted continuously without interruption or artifacts. In some implementations, default priorities may be assigned and updated dynamically during run-time.

In some implementations, priorities of the views are ascertained based, at least in part, on the user's input. For example, where the user is looking straight ahead, the side views may have equivalent priorities that are lower than the priority assigned to the main view. When the user turns his or her head to look left, the left-side view may be prioritized over the right-side view.

In some implementations, the priorities may be determined or updated based, at least in part, on whether a given view is currently visible to the user or likely to become visible to the user within a period of time. To determine those portions of the virtual reality environment that have a high probability of being viewed within a particular period of time, the client device may predict the user's future movements within the virtual environment. More particularly, the client device may determine those view(s) that have the highest probability of being accessed next by the user (e.g., by changing his or her location or perspective within the virtual reality environment) and/or the order in which the views will be accessed. For example, a predictive model may ascertain the possible paths (e.g., states) that the user may traverse within the virtual reality environment, and identify the views within those paths that have a high probability of being viewed next by the user (e.g., via interaction with the client device). The possible paths may be represented by a tree or other suitable data structure.

Information that is used to predict the user's future movements within the virtual environment may include, but is not limited to, the direction that the user is facing or moving within the virtual environment, a speed with which the user is moving, sounds (e.g., noises or disturbances) within the virtual environment, sounds that the device may anticipate within the virtual environment, and/or the location or direction from which sounds are or may be transmitted within the virtual environment. In addition, the information that is used to predict the user's future movements within the virtual environment may include the user's prior activities such as prior purchases, search queries, tweets, etc. In this manner, the client device may use a predictive model to select frames to download, as well as determine the appropriate timing with which to download the selected frames.

The client device may then download the frames of the views based, at least in part, on the priorities and the input (e.g., current position of the user within the virtual reality environment) (512). In some implementations, the client device can acquire the virtual reality content based, at least in part, on the buffer allocation among the views, available buffer space, current bandwidth, whether a given view is currently in view, and/or whether a given view is likely to come into view or be of interest to the user. For example, frames or fragments that correspond to the main view and side view(s) may be downloaded based, at least in part, on the buffer allocation among the views.

In some implementations, the client device may selectively download frames for side views or views that are not currently visible from a current position/perspective of the user within the virtual reality environment. More particularly, for side views or views that are not currently visible from the current position/perspective of the user within the virtual reality environment, downloading of corresponding frames or fragments may be delayed or may be performed such that only a portion of the corresponding frames or fragments are downloaded.

The client device may identify or select at least a subset of the views for which frames or fragments are to be only partially downloaded until the corresponding views become visible. For example, the subset of the views that is identified or selected may include the views corresponding to a 3D virtual object that are not visible from a current position or perspective of the user in relation to the virtual reality environment, where the 3D virtual object is centered or includes the current position. As another example, the subset of the views may include only non-visible views that have a high probability of being rendered (e.g., selected by the user) within a particular period of time. The subset of the views may be selected based, at least in part, on input received or detected via I/O device(s) integral with or coupled to the client device, network conditions (e.g., available bandwidth), buffer allocation among the views, available buffer space, the view type (e.g., main or side) or priority of the view, and/or the time that it takes to download content to the client device.

In a co-viewing environment, it may be assumed that the main view has a high probability of being rendered or that the main view is in view from the current position or perspective of the user. Therefore, the client device may continuously download frames or fragments corresponding to the main view within the limits of the available buffer space.

In some implementations, a bit rate heuristic is applied to request fragments of views at various bit rates. More particularly, the client device may select one of a plurality of playback options based, at least in part, on the priorities, bandwidth, buffer allocation, and/or available buffer space, where each of the playback options corresponds to a different bit rate. For example, the client device may request a fragment corresponding to the main view at a high bit rate if there is sufficient available buffer space within the segment of the buffer allocated to the main view. As another example, the client device may request a fragment corresponding to the right-side view at a low bit rate to ensure that the amount of buffer space allocated to the right-side view is not exceeded. In this manner, the client device may download virtual reality content within current bandwidth constraints.

In some implementations, for a non-visible view (e.g., side view) that has a corresponding sequence of frames including reference frames and non-reference frames, the predictive model may be used to select reference frames to download and the appropriate timing with which to download the reference frames, as will be described in further detail below. Where a view corresponds to a single frame, the frame may be downloaded independent of a predictive model or whether the view is currently visible to the user.

In accordance with various implementations, reference frames for views in the identified subset may be downloaded. For example, reference frames for non-visible views may be downloaded. In one implementation, for each non-visible view in the subset of views, the reference frames in the corresponding sequence of frames are downloaded while the view is not visible without downloading the corresponding non-reference frames. For a given view, the client device can download frames corresponding to the view using the fragment index. More particularly, the client device can request a portion of a fragment by requesting a particular byte range within the fragment, as will be described in further detail below. In one implementation, the client device downloads frames of base layer(s) for each non-visible view in the subset of views. The client device may store the frames in a frame buffer as they are acquired.

In accordance with various implementations, frames are packed for a fragment or view such that reference frames are grouped together in a sequence of frames and the non-reference frames are grouped together in a separate sequence of frames, enabling reference frames for a given view to be downloaded efficiently. Frames may also be grouped according to frame type.

According to one class of implementations, the fragments may be packed at the server side and downloaded in tier order, i.e., grouping frames in chunks of the same frame type, e.g., all of the I-frames, all of the reference P-frames, all of the reference B-frames, etc. For example, frames may be grouped in chunks according to a particular pattern (e.g., I-frames, followed by reference P-frames, etc.). This would allow for the client to request only certain types of frames, e.g., to request only I-frames and reference P-frames.

In implementations in which the frames of a fragment are packed at the server side according to tier order or frame type, the partial fragment request might specify one or more byte ranges that correspond to one or more types of frames. That is, because the frames are arranged in a fragment according to frame type, the client device can use the fragment index to identify the byte range corresponding to frames of a particular type. The request could then be generated to request the byte range(s) associated with specific frame types. For example, the client may request only the I-frames and some of the reference P-frames.

The client device may track which fragments or frames have been downloaded. More particularly, the client device may track the frames or frames that are downloaded for each view. For example, the client device may track whether reference frames have been downloaded for a given view and/or the type of reference frames that have been downloaded for a given view.

When a view in the subset of the views later becomes visible (or is determined to be likely to become visible) to the user at a subsequent position/perspective within the virtual reality environment, non-reference frames in the sequence of frames associated with the view may be downloaded. Non-reference frames may continue to be downloaded from that point in time forward. Where a view is visible and corresponding reference frames have not previously been downloaded, both reference and non-reference frames associated with the view may be downloaded. By selectively downloading reference frames for portions of the virtual reality environment not currently in view, the amount of data that is streamed over the Internet and downloaded to a client device to generate 3D virtual reality video may be significantly reduced.

In accordance with various implementations, the client device may download frames according to the buffer allocation among the views. More particularly, the client device may ensure that the content that is downloaded for a particular view does not exceed the buffer threshold for the particular view. In addition, the duration of content within the portion of the frame buffer allocated to the particular view may be maintained at a minimum threshold level to ensure that frames can be continuously decoded and rendered by the client device without interruption. For example, the client device may maintain a count of the number of frames or bytes corresponding to the particular view in the frame buffer. In addition, the buffer duration of the currently downloading frames for the particular view may be added to the buffer duration for that view. The determination of buffer duration for a view may also account for data being processed in the demultiplexing and/or decoding pipelines that has not yet been displayed.

Figure 6:
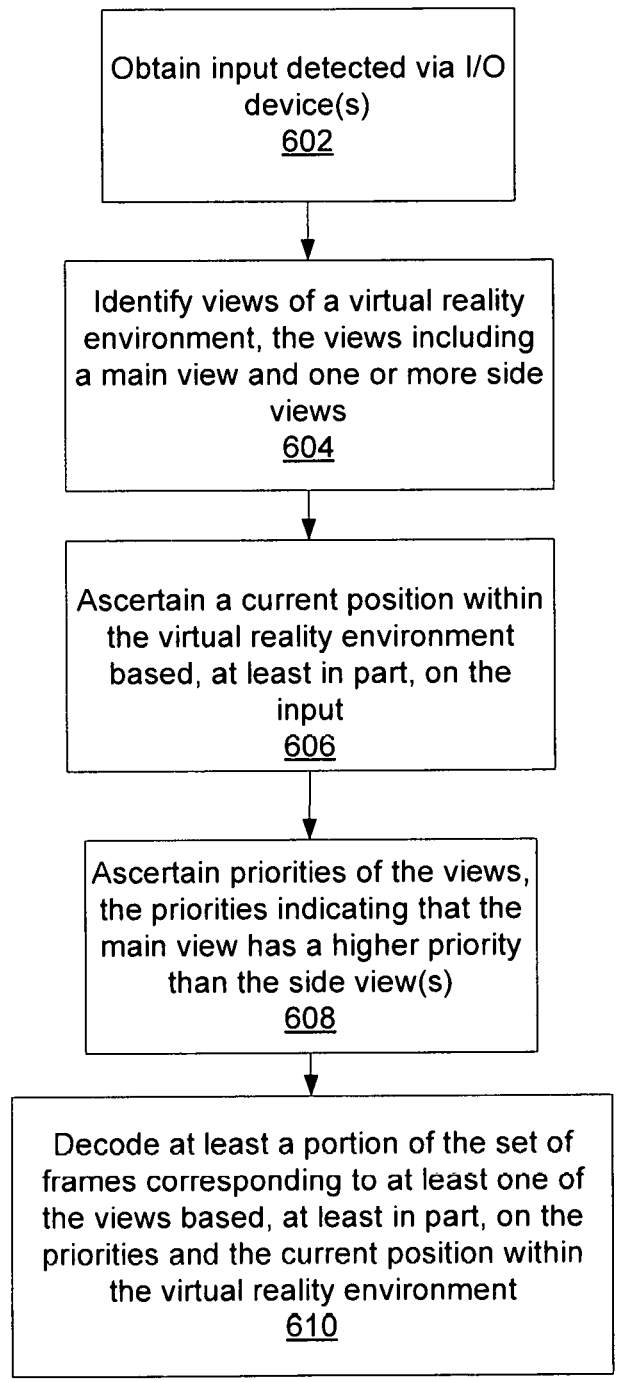
FIG. 6 is a flowchart illustrating a method of decoding virtual reality content according to a particular implementation.

FIG. 6 is a flowchart illustrating a method of decoding virtual reality content according to a particular implementation. The client device may obtain input that has been received or detected via one or more I/O device(s) (602).

The input may indicate the content selected by the user for view(s) of the virtual reality environment, as described above. In addition, the input may indicate a current position/perspective within the virtual reality environment. The I/O device(s) may be integral to the client device or external to the client device.

The client device may identify two or more views of virtual reality content based, at least in part, on the input (604). The views can include a front view and one or more side views. Each of the views may have at least one corresponding frame. At least one of the views has a corresponding sequence of frames including both reference frames and non-reference frames of the virtual reality content. For example, the main view may include a sequence of frames, while each side view may include one or more frames. Each of the views may correspond to one of a plurality of portions of a virtual three-dimensional object in a virtual reality environment.

A current position within the virtual reality environment may be ascertained based, at least in part, on the input (606). For example, the input may indicate that the user is facing forward. As another example, the input may indicate that the user has turned his or her head left or right.

Priorities of the views may be ascertained (608). As described above, the priorities may indicate that the main view has a higher priority than the remaining (e.g., side) views. The priorities may be established statically and/or dynamically. In some implementations, priorities of the views are ascertained based, at least in part, on the user's input. For example, the priorities of the views may be updated during runtime based upon factors such as the current position within the virtual reality environment, the likelihood that the user will access a given view next or within a particular period of time, etc.

Decoding of the virtual reality content may be performed based, at least in part, on the priorities and the current position within the virtual reality environment (610). More particularly, at least a portion of the set of frames corresponding to at least one of the views may be provided to the decoder for decoding. As described above, the priorities may indicate an allocation of a buffer among the views.

A first subset of the views is visible from the current position, while remaining views may not be visible from the current position. For example, while the user of the client device is looking forward, the front view is visible while the side views may not be visible to the user. Non-visible views may correspond to non-visible portions of a virtual three-dimensional object that is centered upon the current position. The non-visible views may include those that can only become visible from other positions or perspectives within the virtual reality environment.

In some implementations, at least one of the views may be treated as visible from all positions within the virtual reality environment. For example, in a co-viewing scenario, users watching a football game would typically not want the game to be disrupted merely because the user turns his or her head to view one of the side views. Therefore, the main view may be treated as visible from all positions within the virtual reality environment.

In some implementations, decoding is performed for only a portion of the set of frames corresponding to one or more views. For example, selected frames may be decoded for side view(s) or view(s) that are not currently visible from the current position within the virtual reality environment. Remaining frames for the view(s) may be decoded as the non-visible view(s) become visible or as it is determined that the non-visible view(s) are likely to become visible. For example, while the user is looking forward at the main view, only reference frames may be decoded for a right-side view. As the user rotates his head right or upon determining that there is a high likelihood that the user will rotate his head right, non-reference frames may be decoded for the right-side view.

In other implementations, the decoding of frames of selected side views or non-visible view(s) may be delayed. Alternatively, a view may be "greyed out" to ensure that a user is not distracted by undesirable visual artifacts during the co-viewing experience.

In accordance with various implementations, a predictive model is applied to determine whether a non-visible view is likely to become visible (e.g., next or within a particular period of time). A decode order may be assigned to the views or associated frames (e.g., reference frames and/or non-reference frames) based, at least in part, on the probability that the views will be selected by the user within a particular period of time and/or the order in which the user is likely to access the various views of the virtual reality environment. The information used by a predictive model to select views for decoding of selected frames may be the same as or different from the information used to select views for downloading of selected frames or fragments. As will be described in further detail below, a predictive model may be applied to select reference frames and/or non-reference frames to decode, as well as determine the timing with which the selected frames are to be decoded.

A non-visible view may be identified as likely to become visible if it is determined to have a high likelihood of interest to the user. A predictive model may identify a side view most likely to be of interest to the user based, at least in part, on one or more factors. These factors can include, but are not limited to, one or more communications of the user (e.g., electronic mails, microblogging messages, etc.), a purchase history of the user, a viewing history of the user, interests of the user that may be ascertained from a profile of the user, a browsing history of the user, and/or a search history of the user. For example, the interests of the user may be explicitly identified by the user or implicitly identified from other factors or information within a user profile. The viewing history of the user may be ascertained based upon information such as content viewed by the user within a virtual reality environment, content that has been viewed via a streaming application, and/or content that has been downloaded to the client device or by the user to another client device.

In some implementations, the system may provide a visual and/or auditory signal to the user in the event that the system predicts that a particular view or portion thereof is likely to be of interest to the user. For example, the signal may be rendered within the main view or the view that is currently visible to the user. As another example, the signal may be rendered within the particular view or portion thereof that the system has identified to be of interest to the user. In this manner, the system may draw the attention of the user to the particular view or portion thereof.

In addition, the decode order that is assigned to the views or associated frames may be determined based, at least in part, on the priorities associated with the views. For example, where the right-side view provides a co-viewing experience, the right-side view may be prioritized over the left-side view.

In some implementations, a second subset of the views that is not visible from the current position may be identified or selected for decoding of corresponding reference frames. The second subset of the views for which reference frames are decoded may be selected from a larger set of non-visible views. For example, the second subset of the views may consist of selected side views that are not visible from the current position. By selectively decoding reference frames for a subset of the non-visible views, the decoding process and the use of decoder resources may be optimized while ensuring that a continuous uninterrupted virtual reality experience is provided to the user.

A view such as a side view may consist of a single frame. In these instances, the frame may be provided to the decoder for decoding. In other words, since a single frame will not consume a significant amount of resources of the client device, the frame may be decoded without delay.

In some implementations, for each selected side view or non-visible view in the second subset of the views having a corresponding sequence of frames, the client device may decode, while the view is not visible, reference frames in the corresponding sequence of frames without decoding corresponding non-reference frames for the view. More particularly, the reference frames for a particular view that is not visible from the current position may be provided, while the particular view is not visible, to a decoder of the client device without providing the non-reference frames for the view to the decoder. The reference frames may be provided to the decoder with a frequency that may be determined based upon factors such as decoder delay and/or the frequency with which the user's position within the virtual environment changes. In this manner, decoding resources may be optimized while ensuring an uninterrupted co-viewing experience.

The reference frames that are provided to the decoder may include I-frames, reference P-frames, and/or reference B-frames. In some implementations, all of the reference frames for a particular view are provided to the decoder. In other implementations, only a subset of the reference frames for a particular view is provided to the decoder. In some implementations, the client device may decode only certain types of reference frames e.g., only I-frames and reference P-frames or, alternatively, may decode reference frames in tier order e.g., I-frames, followed by reference P-frames. By decoding frames in tier order, playback may be achieved for the views with an acceptable level of visual artifacts.

The client device may track which frames have been decoded. More particularly, the client device may track the frames that are decoded for each view. For example, the client device may track whether reference frames have been decoded for a given view and/or the type of reference frames that have been decoded for a given view.

Where the client device determines that a non-visible view is likely to become visible or to be of interest to a user of the client device, a notification may be provided via the client device or another mechanism. Such a notification may include a visual or audio signal. By providing a notification to the user, the likelihood that a non-visible view will become visible can be increased.

Since some non-visible views will not subsequently become visible, the corresponding non-reference frames need not be decoded. As a result, the number of frames that are decoded is significantly lower than traditional decoding schemes. Therefore, decoding resources can be conserved while providing a continuous virtual reality experience.

For each view in the first subset of the views (i.e., visible views), at least the non-reference frames in the corresponding sequence of frames are provided to the decoder. More particularly, when a non-visible view in the second subset of the views later becomes visible, is likely to become visible to the user from a subsequent position/perspective within the virtual reality environment, or is likely to be of interest to the user, corresponding non-reference frames may be decoded (e.g., provided to the decoder for decoding) without decoding the previously decoded reference frames. Reference and non-reference frames may continue to be decoded from that point in time forward. Where a view becomes visible and corresponding reference frames have not previously been decoded, both reference and non-reference frames associated with the view are decoded. In this manner, both reference frames and non-reference frames for the views that are visible to the user may be decoded.

By selectively decoding reference frames that are most pertinent to the position and perspective of the user within the virtual reality environment, the amount of data that is decoded to generate 3D virtual reality video may be minimized. In this manner, the performance of a video decoder may be optimized while optimizing co-viewing in a virtual reality environment.

Figure 7:
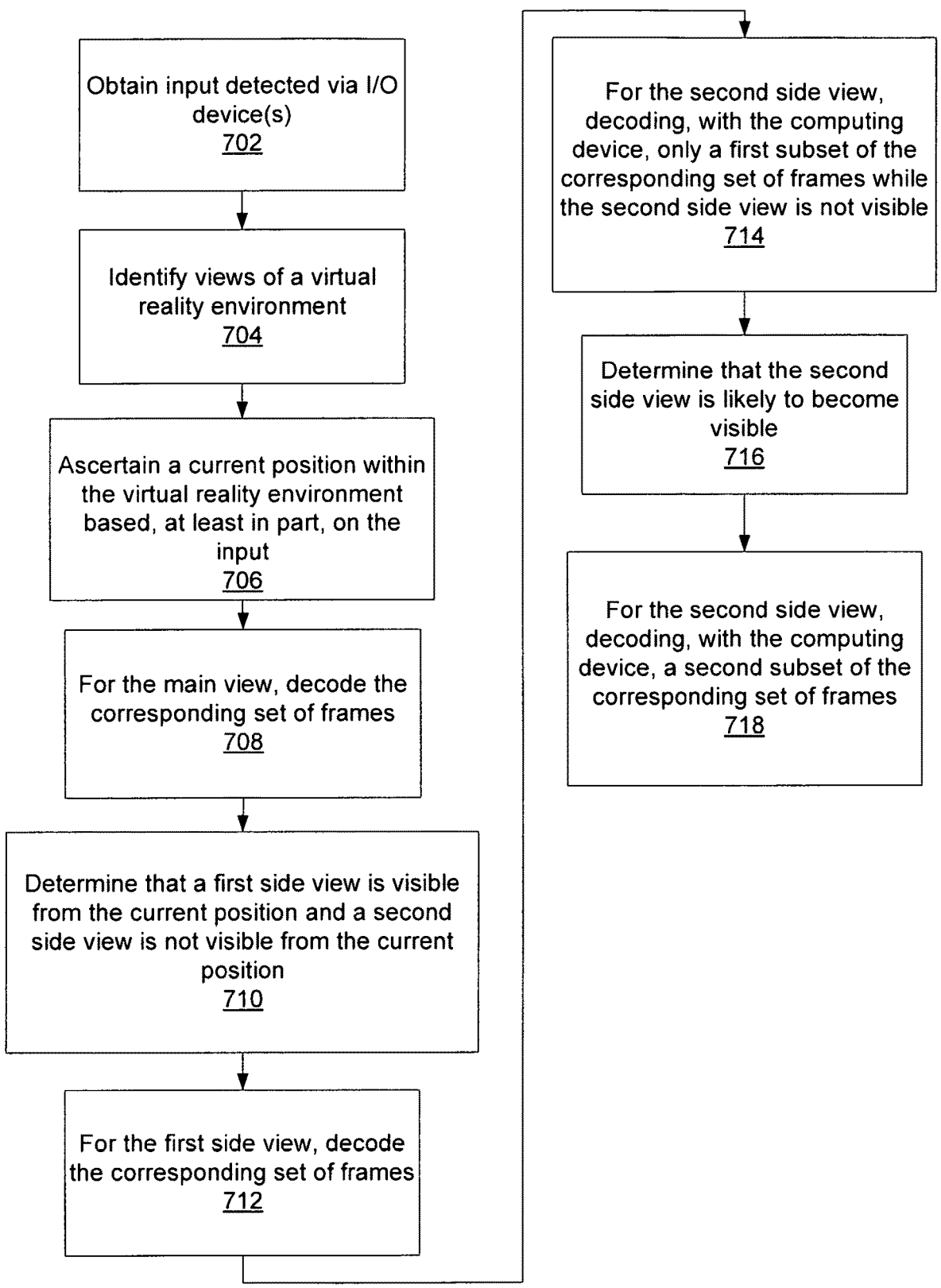
FIG. 7 is a flowchart illustrating a method of decoding virtual reality content to facilitate co-viewing according to a particular implementation.

FIG. 7 is a flowchart illustrating a method of decoding virtual reality content to facilitate co-viewing according to a particular implementation. The client device may obtain input that has been received or detected via one or more I/O device(s), where the input indicates a current position/perspective within the virtual reality environment (702).

The client device identifies two or more views of virtual reality content (704). As described above, the views may be identified based, at least in part, on the input. In one implementation, the views include a front (main) view and one or more side views. More particularly, the side views can include at least one side view via which a user may interact with another co-viewing user, either directly or indirectly. For example, a right-side view may facilitate interaction between or among co-viewing users. The main view may include a sequence of frames, while each side view may include one or more frames.

The client device ascertains a current position within a virtual reality environment based, at least in part, on the input (706). For example, the current position may indicate that the user has turned his head right toward the right-side view.

The client device decodes, for the main view, the corresponding set of frames (708). By consistently decoding frames for the main view, users may have a consistent co-viewing experience.

The client device determines that a first side view of the side views is visible from the current position and a second side view of the side views is not visible from the current position (710). For example, the client device may determine that since the user's head is turned right, the right-side view is visible from the current position and the left-side view is not visible from the current position within the virtual reality environment.

For the first side view, the client device decodes the corresponding set of frames (712). More particularly, since the first side view is visible from the current position within the virtual reality environment, all frames in the set of frames may be decoded.

For the second side view, the client device decodes only a portion of the corresponding set of frames while the second side view is not visible (714). For example, the client device may provide only reference frames corresponding to the second side view to the decoder while the second side view is not visible.

The client device determines that the second side view is likely to become visible (716). For example, the client device may apply a predictive model to determine a probability that the second view is likely to become visible within a particular period of time. Where the client device determines that the second side view is likely to be of interest to the user, the second side view may be considered to have a high probability of becoming visible. In the event that the client device has determined that the second side view or portion thereof is likely to be of interest to the user, a notification may be transmitted to draw attention to the second side view or portion thereof.

After determining that the second side view is likely to become visible, the client decodes remaining frames in the corresponding set of frames (718). For example, the client device may provide non-reference frames corresponding to the second side view to the decoder. As described above, corresponding non-reference frames may be decoded (e.g., provided to the decoder for decoding) without decoding the previously decoded reference frames. Reference and non-reference frames may continue to be decoded from that point in time forward.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   receiving, with a computing device, input that has been received or detected via one or more input/output (I/O) devices;
   determining, with the computing device, a current position within an experiential reality environment based, at least in part, on the input;
   identifying, with the computing device, a plurality of views of experiential reality content, each of the views corresponding to one of a plurality of portions of a virtual three-dimensional object in the experiential reality environment, each of the views corresponding to a set of one or more frames of the experiential reality content, the views including a main view and side views, the side views including a left-side view and a right-side view;
   for the main view, decoding, with the computing device, the corresponding set of frames;
   determining, with the computing device, that a first side view of the side views is visible from the current position and a second side view of the side views is not visible from the current position;
   for the first side view, decoding, with the computing device, the corresponding set of frames;
   for the second side view, decoding, with the computing device, only a first subset of the corresponding set of frames while the second side view is not visible;
   determining, with the computing device, that the second side view is likely to become visible; and
   after determining that the second side view is likely to become visible, decoding, with the computing device, a second subset of the corresponding set of frames.

2. The method as recited in claim 1, wherein for the second side view, decoding, with the computing device, only a first subset of the corresponding set of frames comprises decoding for the second side view, with the computing device, only reference frames while the second side view is not visible; and
   wherein decoding the second subset of the corresponding set of frames comprises decoding for the second side view, with the computing device, corresponding non-reference frames.

3. The method as recited in claim 1, wherein the set of frames corresponding to the first view comprises video content, the method further comprising:
   ascertaining priorities of the views, the priorities indicating, for each of the views, a corresponding priority, the priorities indicating that the main view has a higher priority than the side views;
   for each of the views, selecting one of a corresponding plurality of playback options based, at least in part, on the priorities, each of the corresponding plurality of playback options corresponding to a different one of a plurality of bit rates.

4. The method as recited in claim 1, further comprising:
   determining an allocation of a download buffer among the views;
   downloading, with the computing device, the set of frames corresponding to the main view and the set of frames corresponding to at least one of the side views according to the allocation of the download buffer.

5. The method as recited in claim 1, wherein at least one of the side views corresponds to an interaction between a user of the computing device and another user of a second computing device.

6. A device, comprising:
   a decoder configured to decode video frames encoded according to a particular encoding standard; and
   one or more processors and memory configured to:
   receive input generated by one or more input/output (I/O) devices;
   determine a current position within an experiential reality environment based, at least in part, on the input;
   identify two or more views of experiential reality content, each of the views corresponding to one of a plurality of portions of a virtual three-dimensional object in the experiential reality environment, each of the views corresponding to a set of one or more frames, the views including a main view and one or more side views;
   ascertain priorities of the views, the priorities indicating, for each of the views, a corresponding priority, the priorities indicating that the main view has a higher priority than the side views; and
   instruct the decoder to decode at least a portion of the set of frames corresponding to at least one of the views based, at least in part, on the priorities and the current position within the experiential reality environment.

7. The device as recited in claim 6, wherein at least one of the side views corresponds to an interaction between a user of the device and another user of a second device.

8. The device as recited in claim 6, the processors and memory being further configured to:
   for each of the views,
   select one of a corresponding plurality of playback options based, at least in part, on the priorities, each of the corresponding plurality of playback options corresponding to a different one of a plurality of bit rates.

9. The device as recited in claim 6, the processors and memory being further configured to:
determine an allocation of a download buffer among the views; and
download the set of frames corresponding to the main view and the set of frames corresponding to at least one of the side views according to the allocation of the download buffer among the views.

10. The device as recited in claim 6, the processors and memory being further configured to:
determine that a first side view of the side views is not visible from the current position within the experiential reality environment;
provide only a first subset of the set of frames corresponding to the first side view to the decoder while the first side view is not visible;
determine that the first side view is likely to become visible within a particular period of time; and
after determining that the first side view is likely to become visible within a particular period of time, provide a second subset of the set of frames corresponding to the first side view to the decoder.

11. The device as recited in claim 6, the processors and memory being further configured to:
determine that a first side view of the side views is not visible from the current position within the experiential reality environment;
instruct the decoder to decode a first subset of the set of frames corresponding to the first side view;
determine that the first side view or a portion thereof is likely to be of interest to a user of the device; and
after determining that the first side view or portion thereof is likely to be of interest to the user of the device, instruct the decoder to decode a second subset of the set of frames corresponding to the first side view.

12. The device as recited in claim 6, the processors and memory being further configured to:
determine that a first side view of the side views is not visible from the current position within the experiential reality environment;
determine that the first side view or a portion thereof is likely to be of interest to a user of the device; and
provide a notification indicating that the first view or portion thereof is likely to be of interest to the user of the device.

13. A computer program product, comprising one or more non-transitory computer readable media having computer program instructions stored therein, the computer program instructions being configured such that, when executed by one or more processors, the computer program instructions cause the one or more processors to:
obtain input received or detected via one or more input/output (I/O) devices;
determine a current position within an experiential reality environment based, at least in part, on the input;
identify two or more views of experiential reality content, each of the views corresponding to one of a plurality of portions of a virtual three-dimensional object in the experiential reality environment, each of the views corresponding to a set of one or more frames, the views including a main view and one or more side views;
ascertain priorities of the views, the priorities indicating, for each of the views, a corresponding priority, the priorities indicating that the main view has a higher priority than the side views; and
instruct a decoder of a device to decode at least a portion of the set of frames corresponding to at least one of the views based, at least in part, on the priorities and the current position within the experiential reality environment.

14. The computer program product as recited in claim 13, wherein at least one of the side views corresponds to an interaction between a first user of a first computing device and a second user of a second computing device.

15. The computer program product as recited in claim 13, wherein the computer program instructions are further configured to cause the one or more processors to:
select, for each of the views, one of a corresponding plurality of playback options based, at least in part, on the priorities, each of the corresponding plurality of playback options corresponding to a different one of a plurality of bit rates.

16. The computer program product as recited in claim 13, wherein the computer program instructions are further configured to cause the one or more processors to:
determine an allocation of a download buffer among the views; and
download the set of frames corresponding to the main view and the set of frames corresponding to at least one of the side views according to the allocation of the download buffer among the views.

17. The computer program product as recited in claim 13, wherein the computer program instructions are further configured to cause the one or more processors to:
determine that a first side view of the side views is not visible from the current position within the experiential reality environment;
provide only a first subset of the set of frames corresponding to the first side view to the decoder while the first side view is not visible;
determine that the first side view is likely to become visible within a particular period of time; and
after determining that the first side view is likely to become visible, provide a second subset of the set of frames corresponding to the first side view to the decoder.

18. The computer program product as recited in claim 13, wherein the computer program instructions are further configured to cause the one or more processors to:
determine that a first side view of the side views is not visible from the current position within the experiential reality environment;
instruct the decoder to decode only reference frames corresponding to the first side view while the first side view is not visible;
determine that the first side view or a portion thereof is likely to be of interest to a user of the device; and
after determining that the first side view or portion thereof is likely to be of interest to the user of the device, instruct the decoder to decode non-reference frames corresponding to the first side view.

19. The computer program product as recited in claim 13, wherein the computer program instructions are further configured to cause the one or more processors to:
determine that a first side view of the side views is not visible from the current position within the experiential reality environment;
determine that the first side view or a portion thereof is likely to be of interest to a user of the device; and after determining that the first side view or portion thereof is likely to be of interest to the user of the device, provide a notification indicating that the first view or portion thereof is likely to be of interest to the user of the device.

20. The computer program product as recited in claim 19, wherein the computer program instructions are further configured to cause the one or more processors to:
 determine whether the first side view or portion thereof is likely to be of interest to the user based, at least in part, on one or more of:
  a) one or more communications of the user;
  b) a purchase history of the user;
  c) a viewing history of the user;
  d) a browsing history of the user;
  e) a search history of the user; or
  f) one or more interests of the user.

21. The method as recited in claim 1, wherein decoding the second subset of the corresponding set of frames is performed responsive to determining that the second side view is likely to become visible.

* * * * *